US012198666B2

(12) United States Patent
Dunham et al.

(10) Patent No.: US 12,198,666 B2
(45) Date of Patent: Jan. 14, 2025

(54) SYSTEMS AND METHODS FOR COORDINATING MOVEMENT OF A GROUP OF PEOPLE

(71) Applicant: Marching Assistant Company, LLC, Cheboygan, MI (US)

(72) Inventors: Andrew Allan Dunham, Cheboygan, MI (US); Patrick Eugene Frohoff, Mackinaw City, MI (US); Steven R. Lilly, Grand Rapids, MI (US); Eric Roger Becks, Cheboygan, MI (US)

(73) Assignee: Marching Assistant Company, LLC, Cheboygan, MI (US)

( * ) Notice: Subject to any disclaimer, the term of this patent is extended or adjusted under 35 U.S.C. 154(b) by 0 days.

(21) Appl. No.: 18/378,554

(22) Filed: Oct. 10, 2023

(65) Prior Publication Data
US 2024/0062737 A1 Feb. 22, 2024

Related U.S. Application Data

(63) Continuation of application No. 17/065,944, filed on Oct. 8, 2020, now Pat. No. 11,817,071.
(Continued)

(51) Int. Cl.
G10H 1/40 (2006.01)
G01S 19/19 (2010.01)
G06F 1/16 (2006.01)

(52) U.S. Cl.
CPC .............. G10H 1/40 (2013.01); G01S 19/19 (2013.01); G06F 1/163 (2013.01)

(58) Field of Classification Search
CPC .... G10H 1/40; G10H 2240/325; G01S 19/19; G06F 1/163; G06F 1/1698; G06F 1/3287;
(Continued)

(56) References Cited

U.S. PATENT DOCUMENTS 7,582,822 B1 * 9/2009 Olander-Waters ...... G04F 5/025
84/723
9,812,031 B1 * 11/2017 Wahrmund .......... G09B 19/003
(Continued)

FOREIGN PATENT DOCUMENTS

WO 2016205879 A1 12/2016

OTHER PUBLICATIONS

Body Beat Sync, Peterson Strobe Tuners, http://www.petersontuners.com/products/bodybeatsync/, printed Apr. 16, 2021.
(Continued)

Primary Examiner — Jeffrey Donels
(74) Attorney, Agent, or Firm — Aurora Consulting LLC; Ashley Sloat; Daniel Wright

(57) ABSTRACT

Described herein are methods for coordinating movement of a group of people, comprising: receiving numerical coordinates for each count of a drill for each person in a group of people, wherein the numerical coordinates indicate a location on a field for each person; receiving a starting count for each of the one or more sets and a number of counts in each of the one or more sets for each person; combining the numerical coordinates with the start count and the number of counts for each of the one or more sets; deriving human readable coordinates for each count of the drill for each person, wherein the human readable coordinates indicate the location on the field for each person; and transmitting the human readable coordinates to one or more receiving devices each associated with one person in the group of people.

20 Claims, 9 Drawing Sheets

Related U.S. Application Data

(60) Provisional application No. 62/913,921, filed on Oct. 11, 2019.

(58) Field of Classification Search
CPC ... G06F 1/3209; Y02D 10/00; H04M 1/72457
See application file for complete search history.

(56) References Cited

U.S. PATENT DOCUMENTS

| | | | | |
|---|---|---|---|---|
| 10,242,592 | B2* | 3/2019 | Wahrmund | G01S 5/0226 |
| 11,128,790 | B2* | 9/2021 | Yuan | H04N 23/66 |
| 11,391,571 | B2* | 7/2022 | Stelfox | A63F 13/828 |
| 11,423,464 | B2* | 8/2022 | Fein | G06Q 20/4015 |
| 2011/0296332 | A1* | 12/2011 | Whiting | G06Q 10/00 |
| | | | | 715/771 |
| 2015/0375083 | A1* | 12/2015 | Stelfox | A61B 5/6802 |
| | | | | 700/91 |
| 2015/0378002 | A1* | 12/2015 | Hughes | G01S 5/0289 |
| | | | | 342/451 |
| 2018/0136828 | A1* | 5/2018 | Threewits | G06F 3/04845 |
| 2018/0158362 | A1* | 6/2018 | Wahrmund | G01S 5/0294 |
| 2020/0027370 | A1* | 1/2020 | Wahrmund | G01S 5/0294 |
| 2022/0113932 | A1* | 4/2022 | Aoyama | G06F 1/3215 |

OTHER PUBLICATIONS

Peterson Body Beat Sync Wireless Pulsating Metronome, Sweetwater, http:// www.sweetwater.com/store/detail/BodyBeatSync-Peterson-bodybeat, printed Apr. 18, 2021.

Sweetwater, What Is Temp Map, dated May 1, 2002, http://www.sweetwater.com/insync/tempo-map/, printed Apr. 16, 2021.

* cited by examiner

| Set | Move | Count | A–B | Back–Front |
|---|---|---|---|---|
| #0 | 0 | 0 | 2.25 stps outside B 45 yd ln | 9.75 stps behind Front hash (HS) |
| #1 | 48 | 48 | 0.5 stps outside B 35 yd ln | 12.5 stps behind Front hash (HS) |
| #2 | 40 | 88 | 2.75 stps inside B 35 yd ln | 4.25 stps behind Front hash (HS) |
| #3 | 20 | 108 | 0.5 stps inside B 45 yd ln | 8.25 stps in frnt of Front hash (HS) |
| #4 | 28 | 136 | 0.5 stps outside B 40 yd ln | 12.75 stps behind Front side line |
| #5 | 32 | 168 | 0.25 stps outside B 45 yd ln | 8.5 stps behind Front side line |

FIG. 7

SYSTEMS AND METHODS FOR COORDINATING MOVEMENT OF A GROUP OF PEOPLE

CROSS-REFERENCE TO RELATED APPLICATIONS

This application is a continuation of U.S. Nonprovisional patent application Ser. No. 17/065,944, filed Oct. 8, 2020; which claims the priority benefit of U.S. Provisional Patent Application Ser. No. 62/913,921, filed Oct. 11, 2019, the contents of each of which are herein incorporated by reference in their entirety.

TECHNICAL FIELD

This disclosure relates generally to the field of musical and dance-based performance, and more specifically to the field of performance coordination. Described herein are systems and methods for coordinating movement of a group of people.

BACKGROUND

Musical groups, for example marching bands, and performers, for example color guard or cheerleaders, frequently perform coordinated movements to music. Coordination of movement among performers and according to the music beat and pace can be difficult and require vast amounts of time for studying positions relative to landmarks, one another, and counts or features of the music. Current systems attempt to coordinate movement by providing an in-ear metronome beat or otherwise audible metronome beat. This does function to synchronize steps and musical notes played by instruments, but performers are still required to study and memorize their position relative to landmarks, one another, and each count of the music. The inaccurate movement of one or more performers can result in missteps leading to sloppy routines and inaccurate spelling of messages on the field; for example, "rodeu" instead of rodeo" being displayed on the field.

Accordingly, there exists a need for new systems and methods for coordinating movement of a group of people, for example one or more members of a marching band.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

FIG. 7 illustrates an embodiment of a data input into a system for coordinating movement of a group of people.

Figure 1:
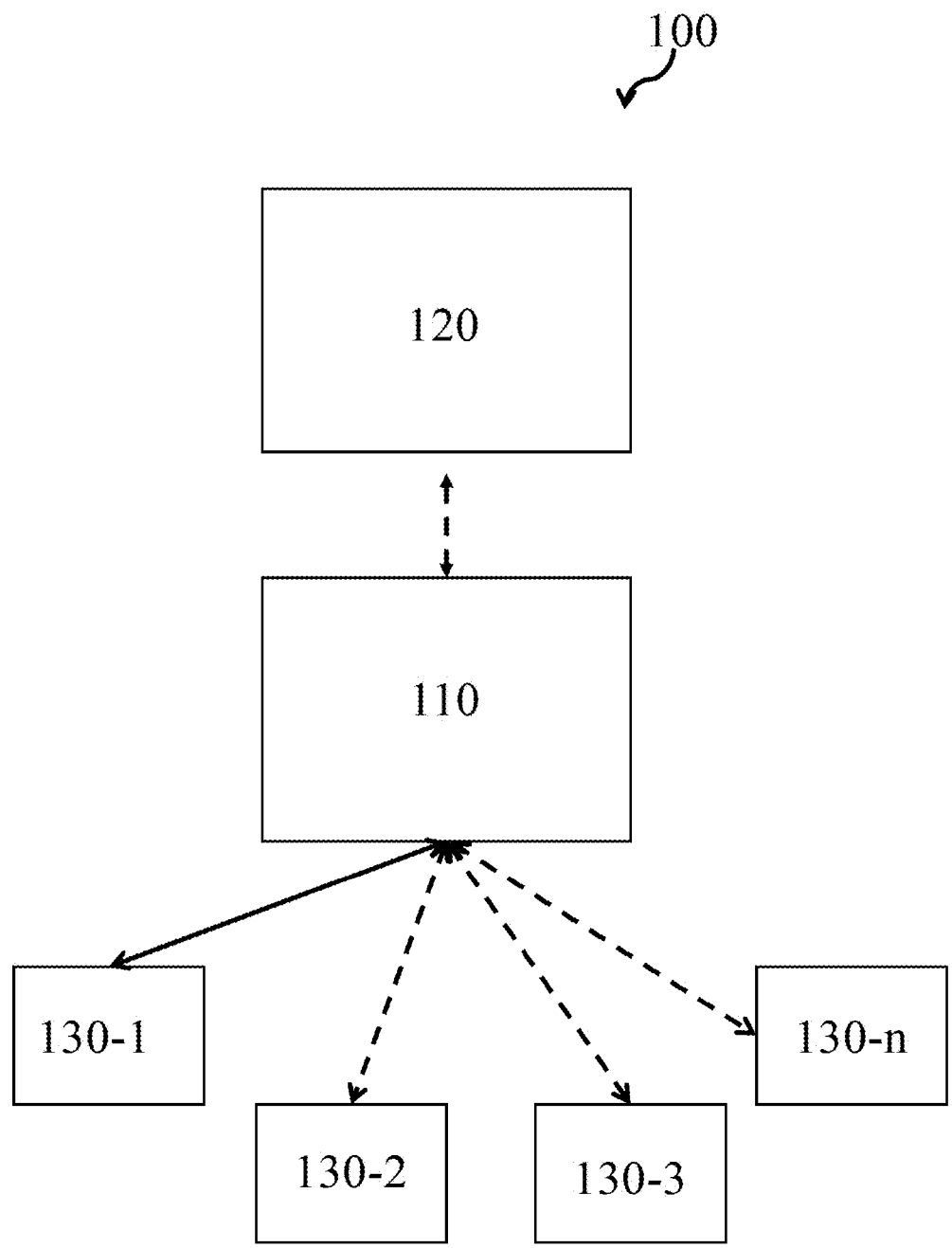
FIG. 1 illustrates a schematic of one embodiment of a system for coordinating movement of a group of people.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Disclosed herein are systems and methods for coordinating movement of a group of people. As used herein, "group" may refer to any size group, for example two or more people, two or more performers, two or more marching band members, a plurality of people, etc.

As used herein, a plurality of counts comprise a set and one or more sets comprise a drill. Each set comprises a series of movements for one or more individuals in the group of people. Said another way, a set is a 'picture' that comprises x, y coordinates, numerical coordinates, or text coordinates for each performer in the group, the 'picture' being realized through a progression of counts throughout the drill. For example, in one set, a performer may move from a first location to a second location while a second performer may move from a third location to a fourth location. During a subsequent set, the performer and/or second performer may have a different pattern of movement than the first set or remain stationary. The drill may be performed to a song, for example in a specific time signature and at a specific tempo. In some embodiments, a plurality of drills may be called a sequence or show. The system may play a plurality of drills in sequence for a show and, in some embodiments, pause between each drill.

As used herein, a count typically corresponds to a single beat (or pulse) in a song, but counts may also exist without music, for example, during rests (silence) in the song, in-between musical selections, or even in the complete absence of music. Count 0 marks the beginning of the drill, and the first set begins on count 0. The song or music is started on count 1. Counts are incremented at a rate that is defined by the tempo, which is specified in beats per minute (BPM).

As used herein, a "performer index" is a number that uniquely identifies each performer in the drill.

As used herein, a "cast identification number (ID)" and "receiving device ID" are used interchangeably to refer to a human readable, unique identifier for each performer in the drill.

As used herein, a "performer name" or "name" is human readable and is used to associate a specific performer with the cast ID or receiving device ID. The name may specifically identify a person (e.g., "Johnathan S"), an instrument (e.g., Bass Drum), or an instrument along with an instance (e.g., "Trumpet 2").

As used herein, a "text coordinate" is a human readable format used to represent numerical coordinates for a performer. For example, a text coordinate may be displayed as "2.75 stps inside B 35 yd In; 4.25 stps behind Front hash" or as "B35-2.75, FH-4.25," as described elsewhere herein.

Figure 5:
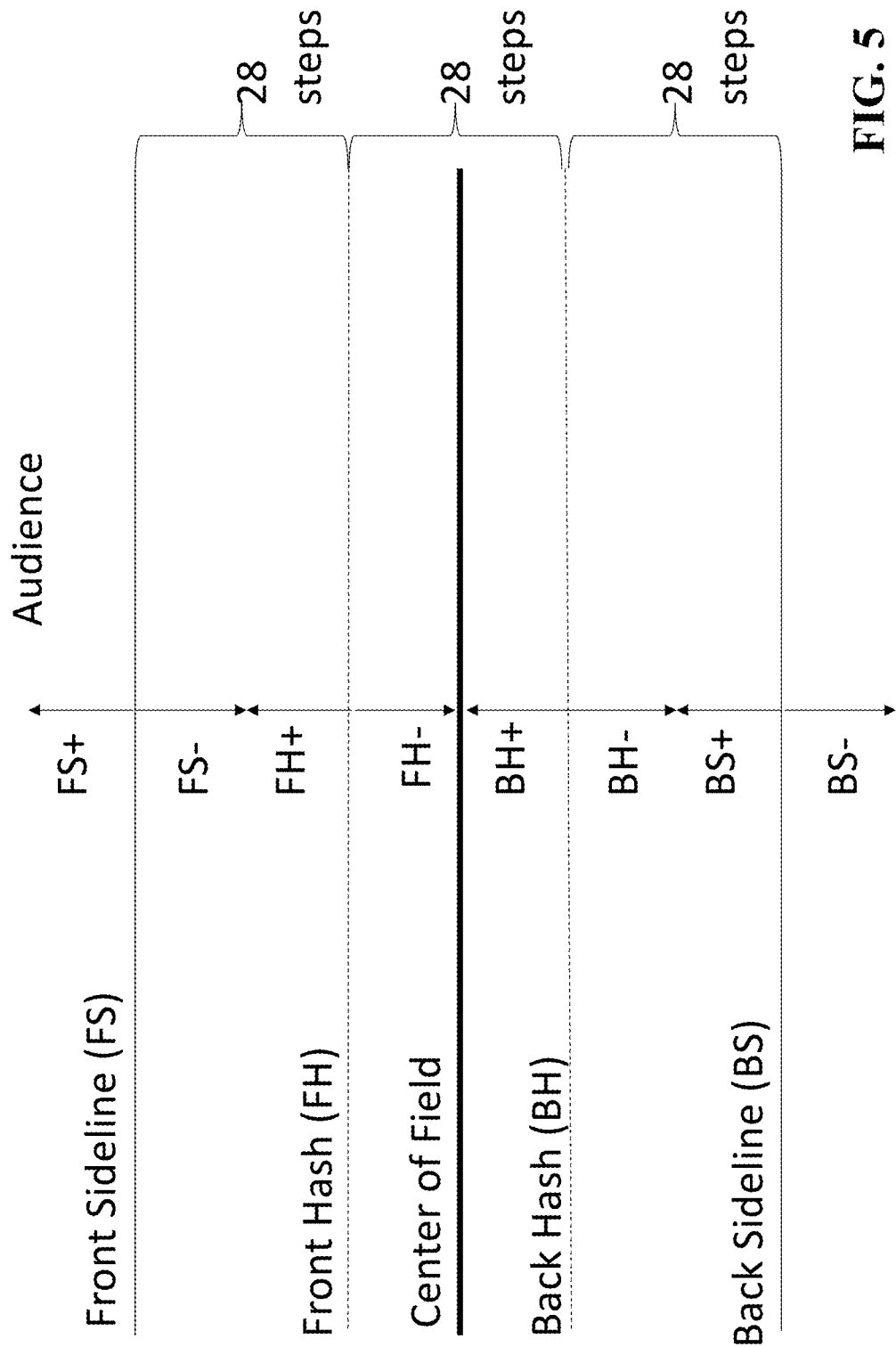
FIG. 5 illustrates exemplary front and back movement commands for coordinating movement of a group of people.

As used herein, a pair of numerical coordinates or text coordinates indicates an x, y location on a field for each person during each count. For example, x equals 0 is at the 50 yd line, with A being the left side (negative x coordinates) from a perspective of the audience facing the field and B being the right side (positive x coordinates) from a perspective of the audience facing field, as shown in FIG. 5. Y equals 0 is at midfield (between the hash marks), with front sideline and front hash mark on a front, audience side of the field (positive y coordinates) and back sideline and back hash mark on a back side or away from the audience side of the field (negative y coordinates).

An example numerical coordinate comprises a letter-based designation for a field section from a perspective of the audience facing the field (e.g., A=left side; B=right side; FS=front sideline; BS=back sideline; FH=front hash mark; BH=back hash mark), optionally a yard line number when using A or B designations, an addition sign or subtraction sign to indicate direction of movement, and a step count number, for example represented in quarter steps.

In some embodiments, coordinate systems are based on landmarks or markings on the field and/or with respect to the audience or director.

Each member of the group of people may have a wearable device, mobile computing device, receiving device, or other computing device coupled to them through which they may receive one or more updates, commands, or instructions, for example indicative of a recommended movement, as described elsewhere herein.

FIG. 1 illustrates an exemplary block diagram of one embodiment of a system 100 for coordinating movement of a group of people using one or more of the methods described elsewhere herein. The system 100 functions to analyze and combine input data, derive additional data from the input data, and output the derived data to one or more computing devices. For example, as shown in FIG. 1, computing device 110 or optionally computing device 120 functions to perform one or more aspects of the methods described elsewhere herein. The commands are then transmitted from computing device 110 to one or more receiving devices 130-1, 130-2, 130-3, 130-n. In some embodiments, computing device 120 functions as a privileged transmitter device, and has been assigned a special identification number ending with the numeric label, for example '0' (e.g., A0, B0, C0). Note that a numeric portion of a lead device ID and receiving device ID or cast ID starts at 1.

In some embodiments, there is unidirectional or bidirectional communication between computing device or lead device 110 and optional computing device 120. Input data may be created and combined on computing device 120 and transmitted to computing device 110 for drill execution. Alternatively, computing device 110 may receive a first set of input data and computing device 120 may receive a second set of input data, that are transmitted to computing device 110, such that the data are combined on computing device 110 and commands are derived by computing device 110. Alternatively, all functions or method steps may be carried out on computing device 110. The command indicates one or more movements (e.g., number of ¼ steps) required to achieve a recommended location on a field for the individual or performer coupled to the receiving device 130. There is further unidirectional or bidirectional communication between computing device or lead device 110 and one or more receiving devices 130, such that the one or more commands derived by lead device 110 are transmitted to the one or more receiving devices 130. In some embodiments, an actual location of each of the one or more receiving devices 130 is transmitted from the receiving device 130 back to the lead device 110, such that an actual location can be compared to a recommended or commanded location.

Bidirectional or unidirectional communication between the computing devices of system 100 may occur via radios or, more generally, network interfaces on each of the computing devices. The radios or network interfaces communicate packets or frames in accordance with one or more communication protocols, such as: an Institute of Electrical and Electronics Engineers (IEEE) 802.11 standard (i.e., Bluetooth™, a cellular-telephone communication protocol, another type of wireless interface, a wired network communication protocol (e.g., Ethernet, Ethernet II or an IEEE 802.3 standard, which are individually or collectively henceforth referred to as 'Ethernet'), and/or another network communication protocol. For example, the cellular-telephone communication protocol may include or may be compatible with: a $2^{nd}$ generation or mobile telecommunication technology, a $3^{th}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. In some embodiments, communication between the lead device 110 and each of the receiving devices 130 occurs at a radiofrequency according to the 915 MHz Industrial, Scientific, and Medical (ISM) radio band, which covers from 902 MHz through 928 MHz. For example, communication between the lead device 110 and each of the receiving devices 130 occurs at a radiofrequency above 900 MHz, for example at 915 MHz. The radiofrequency at which data transmission occurs between computing devices may be configurable, such that multiple channels are available to reduce or eliminate interference between devices.

In some embodiments, various updates, files, or packets may be transmitted between computing devices 110, 120, 130. For example, a lead device 110 may wirelessly transmit a firmware image from local storage to nearby receiving devices 130.

In some embodiments, each receiving device 130 comprises an identification code, for example a letter combined with a number, so that lead device 110 can identify each receiving device 130 and transmit a specific command or instruction to each receiving device 130, as will be described in further detail elsewhere herein. For example, a lead device 110 may broadcast a plurality of packets to one or more receiving devices 130, such that each receiving device 130 receives the plurality of packets and filters them based on a receiving device ID in the packet. The receiving device 130 only keeps the one or more packets that have the correct receiving device ID for the specific receiving device.

In some embodiments, transmission of data between the lead device 110 and each receiving device 130 comprises a binary protocol in order to minimize the size of the transferred packets and facilitate the decoding of packets. Multi-byte fields are sent in network (big-endian) byte order. In this context, big-endian refers to the order in which a sequence of bytes is stored in a computer's memory. In a big-endian system, the most significant value in the sequence is stored at the lowest storage address (i.e., first). Alternatively, a little-endian byte order may be used (i.e., least significant byte of the data is placed at the byte with the lowest address). In some embodiments, a packet transmitted from the lead device to one or more receiving devices includes a lead device ID, an intended receiving device ID (or cast ID), a type, and a payload. For example, a lead device ID may include a letter portion (e.g., A through Z) and a numeric portion (e.g., 1 to nth), and a receiving device ID (or cast ID) may include a letter portion (e.g., A through Z) and a numeric portion (e.g., 1 to nth). Alternatively, a receiving device ID (or cast ID) may include a symbol (e.g., an asterisk) in place of the letter and/or numeric portion to indicate that the instructions or commands should go to all receiving devices communicatively connected to the lead device. Alternatively, or additionally, a receiving device ID (or cast ID) may include a symbol (e.g., #) and a number to indicate a group, which refers to a subset of the total group of performers or individuals.

Various types and payloads will now be described in detail. In some embodiments, a lead device may periodically (e.g., every 10, 15, 20, 30, 35, 40, 45, 50, 55, 60, 100, 1000 milliseconds, etc.) transmit a packet to one or more receiving devices that specifies a type 0 or lead on mode and no payload to indicate that the lead device is powered on but no metronome or drill instructions or commands are sent. Type 0 functions to keep the lead device and the one or more receiving devices communicatively coupled.

In some embodiments, a lead device may transmit a packet to one or more receiving devices that specifies a type 1 or ping mode and no payload, which determines which receiving devices are powered on and in receive mode. Type 1 functions to "ping" or send a request for acknowledgement to the one or more receiving devices to determine which are powered on and in receive mode.

In some embodiments, a receiving device may transmit a packet to a lead device that specifies type 2 or response mode and no payload, which indicates a response from a receiving device to a lead device. Type 2 functions to transmit a response "ping" or an acknowledgement from a receiving device to a lead device.

In some embodiments, a lead device may transmit a packet to one or more receiving devices that specifies a type 10 or metronome mode and a metronome payload. The packet is timestamped in milliseconds for when it was generated on the lead device. The packet further specifies whether a metronome playback should be active (e.g., 0=stopped, 1=active); a tempo (e.g., 40-180 beats per minute); a number of beats per measure; and a zero-based index of a current beat within a given measure.

In some embodiments, a lead device may transmit a packet to one or more receiving devices that specifies a type 11 or drill mode and a drill payload. The packet is timestamped in milliseconds to indicate when the packet was generated on the lead device. The packet further specifies whether a drill playback should be active (e.g., 0=stopped, 1=active); a drill number to perform; and a scaling factor (e.g., 50 to 150%) to be applied to a current tempo within the drill. The packet further specifies whether a lead-in sequence is active (e.g., 0=regular drill, 1=lead-in active); and a count of the lead-in sequence prior to starting at the count specified in the count field. For example, an 8-count lead-in sequence would have values of −7, −6, −5, −4, −3, −2, −1, 0. The drill begins when the lead-in count reaches zero. The packet further specifies an ending set when executing a current drill. In some embodiments, the ending set feature is used when the receiving device is operating autonomously (e.g., has not received packets from lead device or is in practice mode). The packet may further specify a current count within a drill (e.g., 0-65536). Note that the count starts at zero (where the set 0 is defined), but that the music (i.e., a downbeat or a measure 1) starts on count 1.

In some embodiments, a lead device may transmit a packet to one or more receiving devices that specifies a type 20 or download mode and a download payload, which transmits information that is ready for download by the receiving device.

In some embodiments, a lead device may transmit a packet to one or more receiving devices that specifies a type 100 or error test mode and error rate test payload to run error rate tests for different sized packets.

In some embodiments, lead device 110, receiving device 130, and optional computing device 120 comprise a laptop, netbook, notebook, desktop computer, workstation, mobile computing device, wearable device, etc. In one embodiment, lead device 110 and receiving device 130 comprise a wearable device such that an instructor may wear lead device 110 and each performer may wear a receiving device 130, such that lead device 110 functions to transmit instructions or commands from lead device 110 to each receiving device 130.

Figure 2:
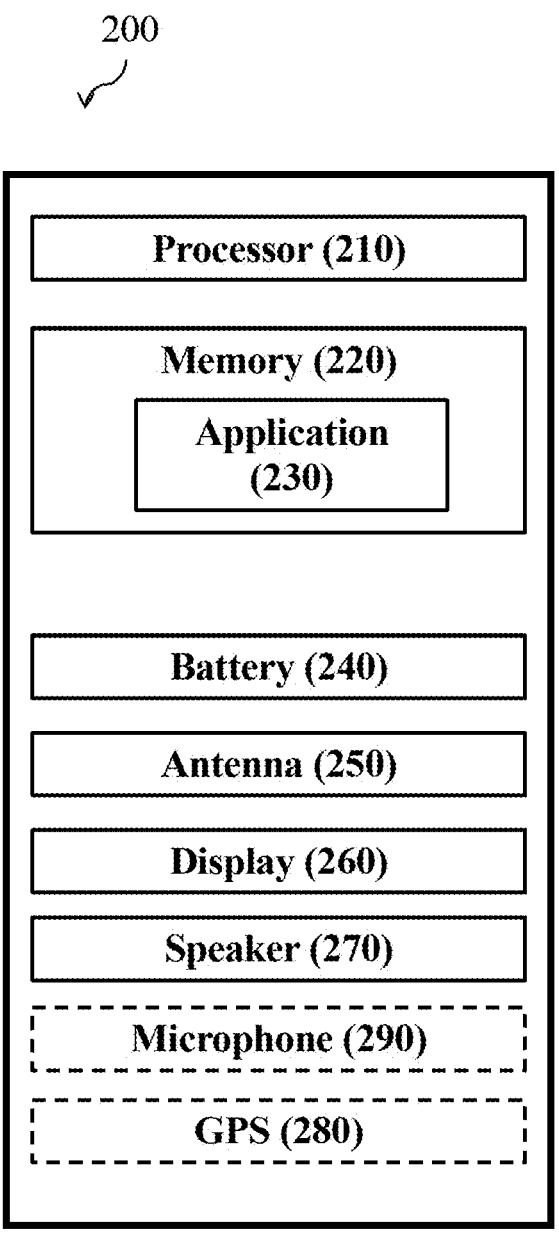
FIG. 2 illustrates a schematic of one embodiment of a computing device, lead device, and/or receiving device configured for coordinating movement of a group of people.

Turning now to FIG. 2, which shows schematically, various components of computing device 110, 120, 130. Computing devices 110, 120, 130 may include a processor 210. The processor 210 may be a general purpose microprocessor, a digital signal processor (DSP), a field programmable gate array (FPGA), an application specific integrated circuit (ASIC), or other programmable logic device, or other discrete computer-executable components designed to perform the functions described herein. The processor 210 may also be formed of a combination of computing devices, for example, a DSP and a microprocessor, a plurality of microprocessors, one or more microprocessors in conjunction with a DSP core, or any other suitable configuration.

In some embodiments, the processor 210 is coupled, via one or more buses, to the memory 220 in order to read information from, and optionally write information to, the memory 220. The memory 220 may be any suitable computer-readable medium that stores computer-readable instructions for execution by a processor 210. For example, the computer-readable medium may include one or more of RAM, ROM, flash memory, EEPROM, a hard disk drive, a solid state drive, or any other suitable device. In some embodiments, the computer-readable instructions include software stored in a non-transitory format. The software may be programmed into the memory 220 or downloaded as an application 230 onto the memory 220. The software may include instructions for running an operating system and/or one or more programs or applications. When executed by the processor 210, the programs or applications may cause the processor 210 to perform a method of coordinating movement of a group of people, as described in further detail elsewhere herein.

Computing devices 110, 120, 130 further include a visual display 260 with or without touch responsive capabilities (e.g., Thin Film Transistor liquid crystal display (LCD), in-place switching LCD, resistive touchscreen LCD, capacitive touchscreen LCD, organic light emitting diode (LED), Active-Matrix organic LED (AMOLED), Super AMOLED, Retina display, Haptic/Tactile touchscreen, or Gorilla Glass). In some embodiments, a display 260 of computing device 110, 130 comprises a color thin film transistor (TFT) display. In some embodiments, a display 260 of a receiving device may be used to power on/off the device; select a menu to select various modes (e.g., learn, rehearse, perform); and/or display a current set, count, A/B (i.e., x) position, and Back/Front (i.e., y) position. In some embodiments, a display of a lead device may display a selected drill number and allow selection of a beginning set, an end set, and a speed (i.e., tempo). A display 260 of a lead device may further allow a user of the lead device to start, stop, and/or reset a drill.

Computing devices 110, 120, 130 further include a battery 240. Battery 240 may be a rechargeable battery (e.g., lithium ion) or a disposable battery. Computing devices 110, 120, 130 further include an antenna 250 (e.g., transceiver) for receiving one or more packets of data from one of the other computing devices and transmitting one or more packets of data to one of the other computing devices. For example, lead device 110 may transmit packets of data to one or more receiving devices 130 and one or more receiving devices 130 may transmit packets of data to a lead device 110.

Computing devices 110, 120, 130 may further include a speaker 270 or headphone jack configured to output audible commands or instructions. For example, a packet received by a receiving device 130 from a lead device 110 may include a command for a location on a field. Such command may be output audibly from receiving device via speaker 270. Computing devices 110, 120, 130 may optionally include a microphone 290 to enable unidirectional or bidirectional communication between users of the computing devices, for example, using a radiofrequency range between 450-470 MHz.

In some embodiments, computing devices 110, 120, 130 may include a location sensor to indicate a position of a device, for example on a field. For example, a receiving device 130 may transmit, via antenna 250, its location to a lead device 110. In some embodiments, once a current position of a receiving device 130 is received, a lead device 110 may adjust a command and transmit the command to the receiving device 130 to adjust a location of the receiving device 130.

In some embodiments, computing devices 110, 120, 130 may further include a clock and/or time. The clock and/or time may function to allow monitoring of a length of a drill, a tempo of a song or music, etc.

Methods

Figure 9:
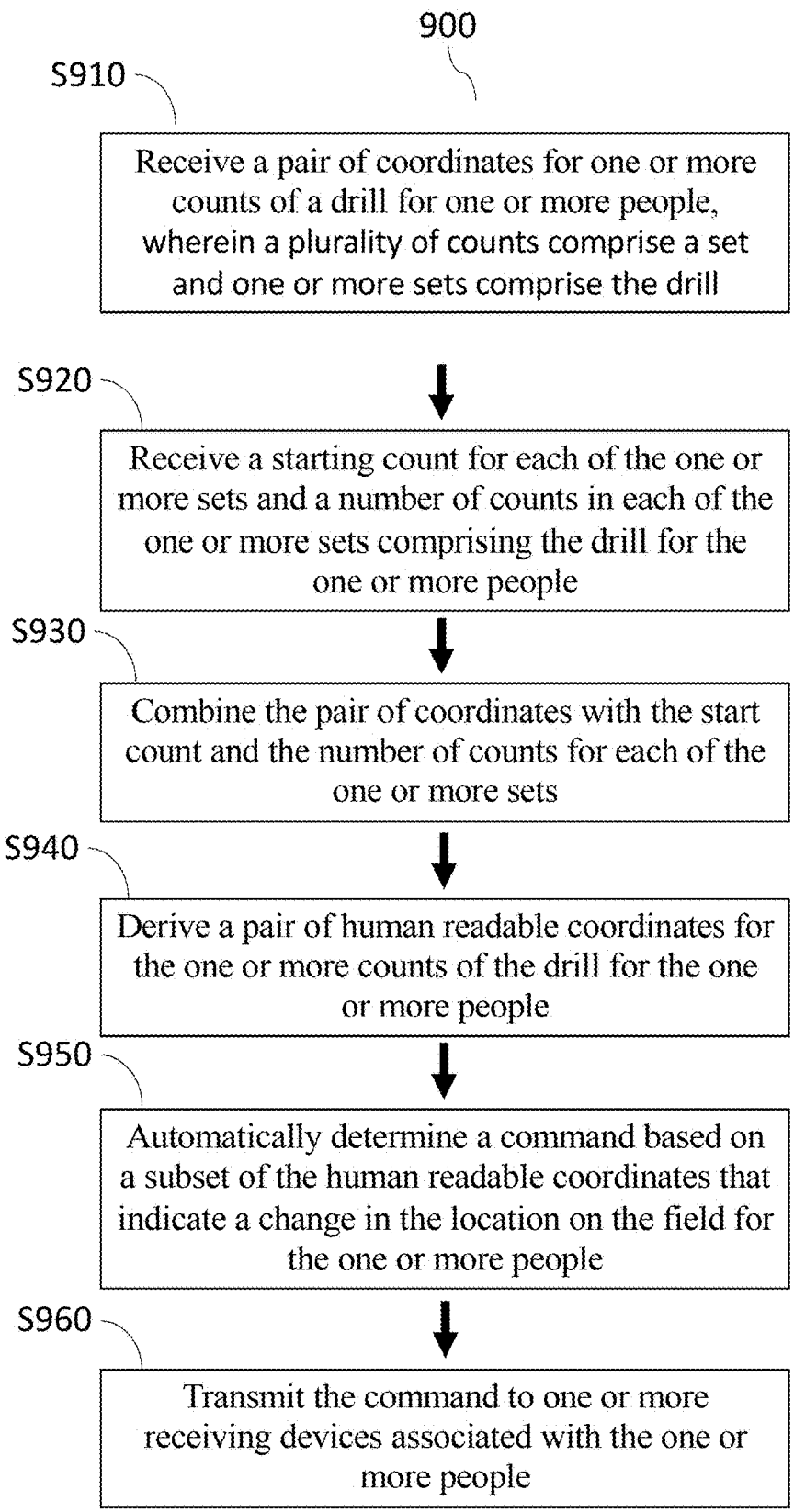
FIG. 9 illustrates a flow diagram of one embodiment of a method for coordinating movement of a group of people.

The methods described herein may be performed by one or more computing devices 110, 120, 130. As shown in FIG. 9, a method for coordinating movement of a group of people of one embodiment includes: receiving a pair of coordinates for one or more counts of a drill for one or more people, wherein a plurality of counts comprise a set and one or more sets comprise the drill, and wherein the pair of coordinates indicates a location on a field for the one or more people during the one or more counts S910; receiving a starting count for each of the one or more sets and a number of counts in each of the one or more sets comprising the drill for the one or more people S920; combining the pair of coordinates with the start count and the number of counts for each of the one or more sets S930; deriving a pair of human readable coordinates for the one or more counts of the drill for the one or more people, wherein the pair of human readable coordinates indicates the location on the field for the one or more people during the one or more counts S940; automatically determining a command based on a subset of the human readable coordinates that indicate a change in the location on the field for the one or more people S950; and transmitting the command to one or more receiving devices associated with the one or more people S960. The method 900 functions to receive and combine or parse input coordinate data and count and set data and automatically derive human readable coordinates and commands for transmission to receiving devices for execution by a performer.

The method 900 function to receive and combine input data to ultimately create commands for transmission to one or more receiving devices to coordinate movement of a group of people that have, are wearing, or are otherwise coupled to the one or more receiving devices. The input data may be combined into one or more associative arrays that are then used to derive coordinates and determine commands for each performer.

Figure 3:
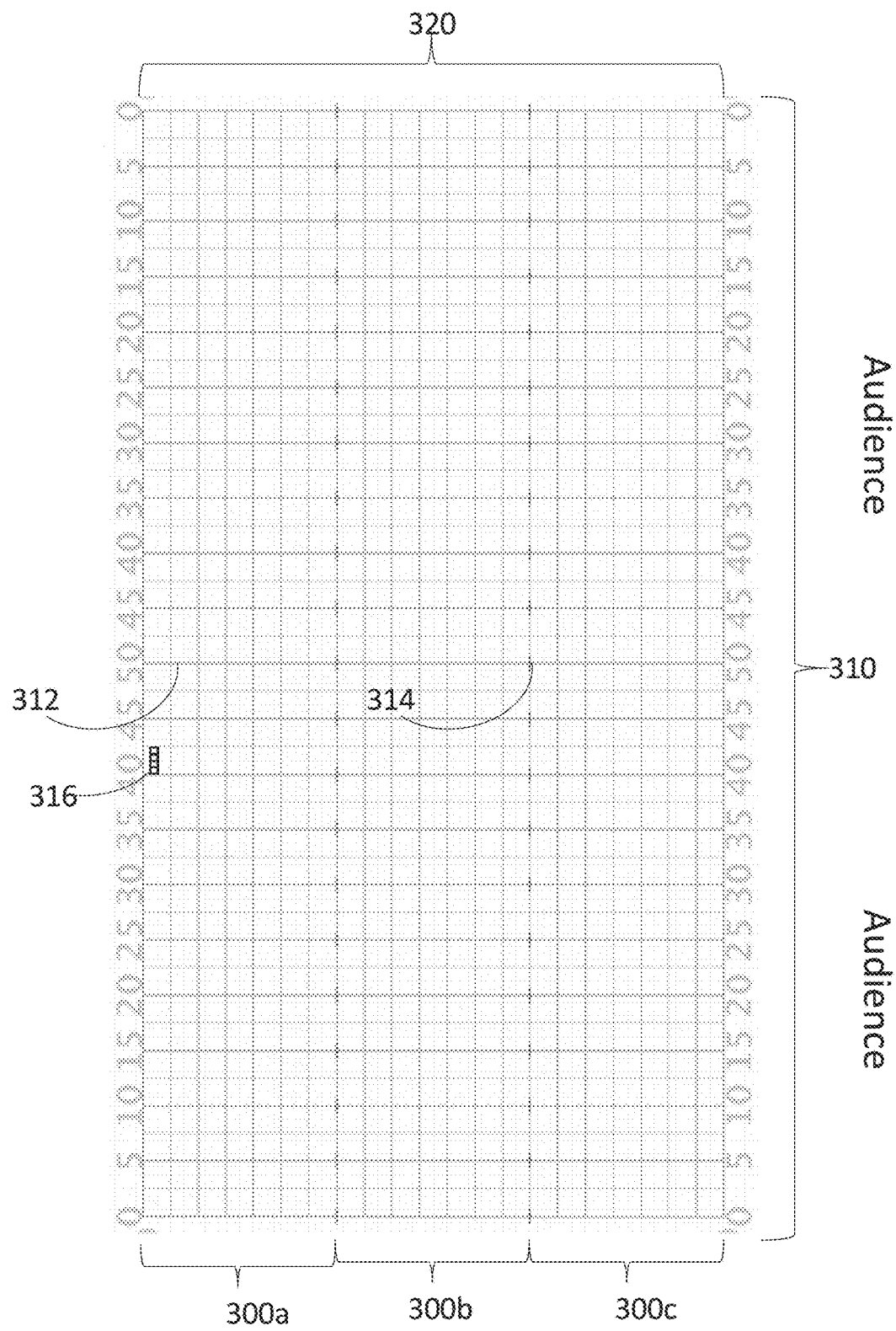
FIG. 3 illustrates an exemplary field for which a system and method for coordinating movement of a group of people may function.

For example, a first data input specifies a pair of coordinates (i.e., location) for each count in the set for each drill for each performer. The coordinates may comprise relative coordinates, absolute coordinates, text coordinates, x-y coordinates, or numerical coordinates. In some embodiments, the pair of coordinates is indicated by $\frac{1}{120}^{th}$ steps, whereas a resolution of $\frac{1}{4}^{th}$ step or $\frac{1}{2}$ step or 1 step may be needed to derive coordinates and determine commands. The first data input may further specify a performer. Turning to FIG. 3, each box 316 represents one step that may be taken by a performer or individual, such that there are eight steps per every five yards in left to right movement and 28 steps between a sideline and hash mark or between hash marks, at least for grade school sized fields. In some embodiments, a location of a performer or individual may be based on a quarter step, such that there are 32 quarter steps per five yards or 112 quarter steps between the sideline and the hash mark or between hash marks, at least for grade school sized fields. Quarter steps may be represented as a fraction of an integer, for example 3.75 indicates three steps and a ¾ step.

Further for example, a second data input specifies one or more of or a combination of: a count associated with each set in a drill (i.e., a number of counts per set), a starting count for each of the one or more sets, a number of counts in each of the one or more sets, and a human readable description of the coordinates (i.e., location) for each performer at each set in the drill.

The first and second data inputs are combined by, for example, creating a first associative array or a performers array. The first associative array or performers array may be keyed, for example, by a performer index and/or a receiving device ID and/or a cast ID. Exemplary, non-limiting examples of objects within the performers array include: performer index, performer name, receiving device ID (in some embodiments, letter and numeric portions are treated as separate objects), cast ID (in some embodiments, letter and numeric portions are treated as separate objects), and numerical coordinates for each count in a drill. The data in the performers array is parsed from the first data input. For example, method 900 functions to parse a performer's index, symbol (letter portion), label (numeric portion) from the first data input, and concatenate the letter and numeric portions to form the cast ID or receiving device ID to form the performers array. The method further functions to derive one or more pairs of numeric coordinates by parsing an x and y coordinate from the first data input, convert the x and y coordinates from $1/120^{th}$ steps to $1/4$ steps by rounding to the nearest $1/4$ step, and append the x, y coordinates in the performers array to reflect the $1/4$ steps instead of the $1/120^{th}$ steps.

Further, the first and second data inputs are combined by, for example, creating a second associative array or a sets array that is keyed, for example, using a starting count for each set. Exemplary, non-limiting examples of fields in the sets array include: a starting count for each set, a number of counts in each set, and/or a name for each set. The data in the performers array is then used to complete the sets array by: parsing one or more of: a performer name, symbol (letter portion), and label (numeric portion) from the second data input, concatenating the letter and numeric portions to create a cast ID or receiving device ID, looking up each performer in the performers array using the cast ID or receiving device ID, and populating a name field in the sets array with the performer name from the performers array. The method 900 then further functions to parse one or more of: a set count, a number of counts in each set, and a set name; and look up a set in the sets array using the count. If a set it not found in the sets array, the method 900 functions to create a new set object and add it to the sets array and populate the set count, a number of counts in the set, and a name for the set with the parsed values from the second data input.

Now that the first and second data inputs are combined, the method 900 functions to output the performers array and sets array in a single file that is optimized for use on a lead device and one or more receiving devices, as described elsewhere herein. Optimization may include, but not be limited to: sorting the sets array by count; including template time signature and tempo definitions that may be updated by a director or other user; including template global command definitions; sorting the performers array by cast ID or receiving device ID; and/or updating the coordinates for each performer with a count, a pair of numerical coordinates per count, and/or template performer-specific commands. The performer-specific commands may be manually input or automatically generated by the system, for example by a processor associated with the system.

Figure 4:
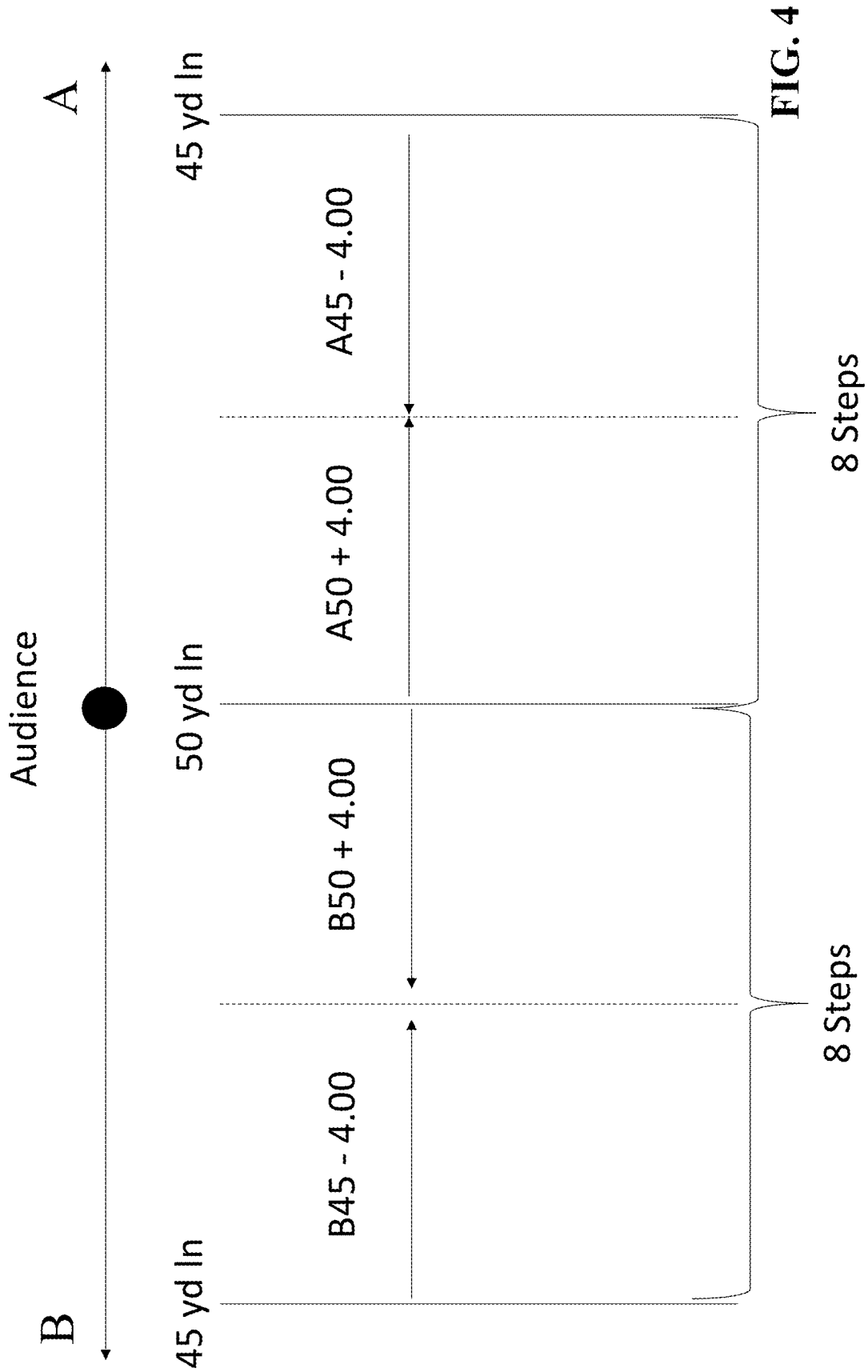
FIG. 4 illustrates exemplary left and right movement commands for coordinating movement of a group of people.
Figure 6:
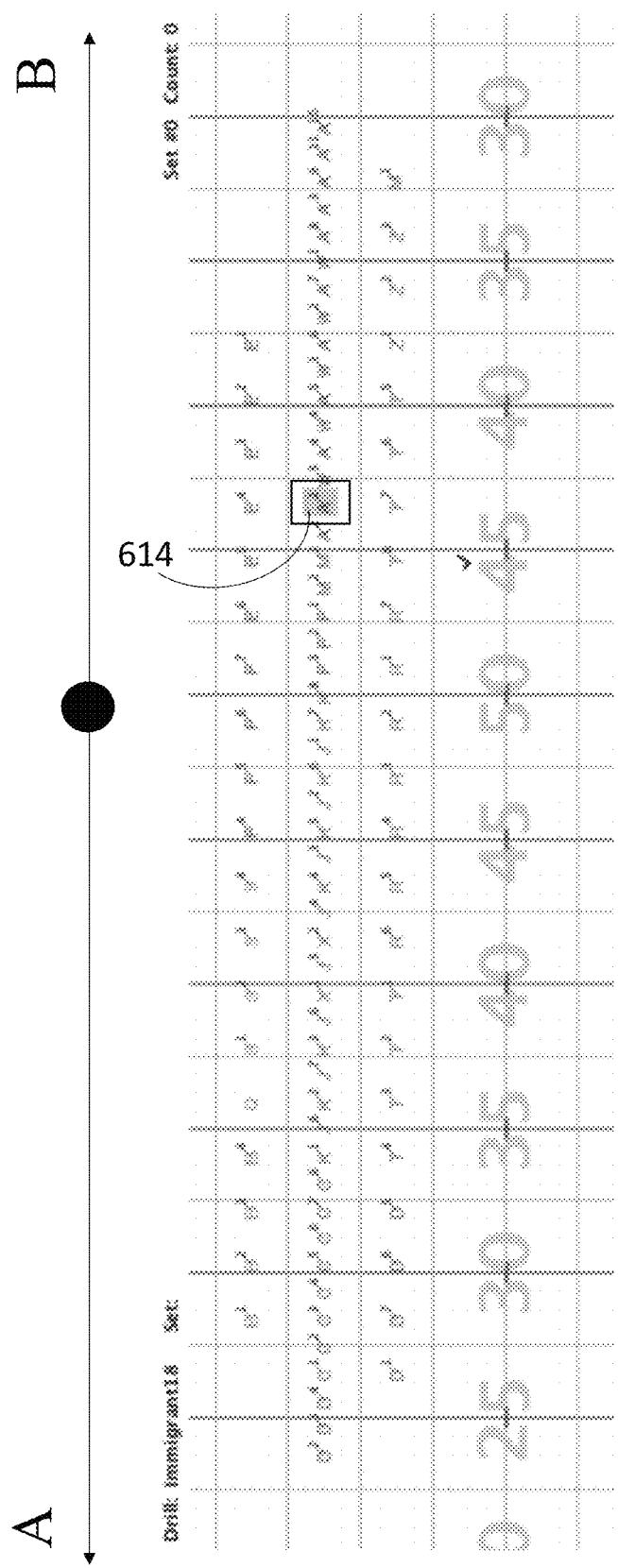
FIG. 6 illustrates an exemplary position of a person on a field using the commands of FIGS. 4-5.

In some embodiments, the pair of coordinates or a location for each performer associated with each count of a set of a drill is transmitted to each performer and/or receiving device using the system shown in FIGS. 4-6. As shown in FIG. 4, for text coordinates, left and right movement is indicated in terms of A for movement on a right side of the field when facing an audience and B for movement on a left side of the field when facing the audience. A and B movement is relative to yard lines. For example, movement from the 50 yard line towards the right is indicated by A50+step count while movement from the 45 yard line towards the B side (while still on the A side) is indicated by A45-step count. Similarly, movement from the 50 yard line towards the left is indicated by B50+step count while movement from the 45 yard line towards the A side (while still on the B side) is indicated by B45-step count. For example, a command for a performer or individual to move to the right four steps from a 50 yard line may appear as "A50+4.00" or to move to the left four steps from a 50 yard line may appear as "B50+4.00." If a performer is on the left side (B side) of the field, at the 45 yard line but needs to move towards the right (A side) 4 steps, a command may appear as "right 4 steps" or "slide right 4 steps." While A and B designations are used above and elsewhere herein, one of skill in the art will appreciate that any designation (e.g., numeric, symbol, alphanumeric, etc.) for right and left sides of a field or area may be used.

As shown in FIG. 5, front and back movement is relative to a front sideline (FS), a front hash mark (FH), a back hash mark (BH), and a back sideline (BS). As shown in FIG. 3, assuming the field is a grade school field, a distance 300c between a front sideline and a front hash mark equals a distance 300b between a front hash mark and a back hash mark, which equals a distance 300a between a back hash mark and a back sideline. As such, there are 28 steps in each of these zones or 112 quarter steps. Movement from a front side of the field towards a back side of the field is indicated either by FS-step count or FH-step count. Movement from a back side of the field towards a front side of the field is indicated either by BS+step count or BH+step count. Movement from a front side of the field towards the front side is indicated either by FS+step count or FH+step count. Movement from a back side of the field towards the back side is indicated by either BH-step count or BS-step count.

As shown in FIG. 6, a location 614 of performer A1 is B45+2.25 meaning on the left side of the field with respect to the audience and 2.25 steps to the left of the 45-yard line.

In some embodiments, the method 900 further includes adjusting the pair of coordinates to reflect a selected field type and a field size. FIG. 3 shows an exemplary embodiment of a field. As described elsewhere herein, a location or a pair of coordinates of one or more individuals in the group may be relative to one or more markings (e.g., yard lines, hash marks, etc.) on a field. Non-limiting, exemplary embodiments of fields include: a football field, a soccer field, a gymnasium, a baseball field, a hockey field, an ice rink, a cricket field, tennis court, etc. Within each category or type of field, there are different field sizes based on whether it is a grade school field, a college field, or a professional field. For example, in football, the total length of the football field is 120 yards. The playing field 310 is 100 yards (i.e., 300 feet) long, and each end zone is ten yards (i.e., thirty feet) deep. The field is marked with a yard line 312 every five yards, and every ten yards is marked by a field number. The hash marks 314 are one yard apart, used to mark each down when the ball is between the yard lines.

A width 320 of a standard football field is 53$\frac{1}{3}$ yards, or 160 feet, wide. The primary difference among different levels of play is the distance 300b between the two sets of hash marks: in grade school the distance 300 is 53 feet, 4 inches (i.e., distance 300c between front sideline and front hash mark equals distance 300b between front hash mark and back hash mark equals distance 300a between back hash mark and back sideline); in college the distance 300 is 40 feet; and in professional football the distance 300 is 18 feet, 6 inches. The systems and methods described herein will account for these field to field differences by adjusting the location information (i.e., the commands or instructions or pair of numeric coordinates) transmitted to each receiving device and thus to each individual or performer.

Returning to FIG. 9, one embodiment of a method 900 of coordinating movement of a group of people includes block S950, which recites automatically determine a command based on a subset of the human readable coordinates that indicate a change in the location on the field for the one or more people. The processor on computing device 120 or computing device 110 may be configured to automatically generate command prompts for one or more performers based on one or more of the following criteria: current location of the performer, location of the performer at the next and subsequent counts in the set, and location of the performer at the next set. The commands may be customizable, for example, using a voice generator or by receiving one or more voice commands from a user, storing the one or more voice commands, and transmitting the one or more voice commands.

In some embodiments, the system includes a game setting such that a plurality of commands is played randomly by a lead device over a metronome beat, and each user associated with a receiving device is requested to follow the commands. If a user associated with a receiving device misses a command or moves in the wrong direction, the user is "eliminated" from the game. A winner of the game may be determined automatically by the system or manually by a user of the system.

As shown in FIG. 9, one embodiment of a method 900 for coordinating movement of a group of people includes block S960, which recites transmitting the command to one or more receiving devices associated with one or more people in a group. In some embodiments, transmitting occurs at a radiofrequency above 900 MHz or in a 915 MHz ISM band. There are several advantages to using the 915 MHz ISM band. For example, there is less congestion in this band as compared to 2.4 GHz ISM band (e.g., used by Bluetooth, Wi-Fi®) of the 5.8 GHz ISM band (e.g., used by Wi-Fi®); 915 MHz ISM band has longer range and better penetration potential; lower power consumption; higher allowable power output when compare with 433 MHz ISM band; and requires a smaller antenna when compared to the 433 MHz ISM band. Alternatively, in some embodiments, transmitting occurs at a radiofrequency between about 2.4 GHz and about 2.5 GHz (i.e., Bluetooth frequency), due to the widespread use and ease of Bluetooth, even despite the above-mentioned drawbacks.

Due to a potentially large number of receiving in devices in a group, a lead device may transmit packets as broadcasts, such that each receiving device does not provide an acknowledgement for each received packet (i.e., unidirectional packet transmission/receipt). This avoids a potentially large number of response packets being generated by all the receiving devices in a group, along with the associated RF bottleneck. This one-way broadcast RF transmission/reception scheme is not 100% reliable, so measures are taken by each receiving device, as described elsewhere herein, to ensure that it doesn't skip execution of a count within a drill, even when the packet associated with that count is corrupted or otherwise lost.

The method may further include transmitting a tuning note command from a lead device to one or more receiving devices. For example, the lead device may be configured to receive a user input for a tuning note (e.g., $B^b$, F, A, etc.) and/or a pitch standard (e.g., A440, A438, A442, etc.), which is then transmitted to the one or more receiving devices. Alternatively, or additionally, the tuning note command may be automatically generated based on a key of the song or music and/or based on one or more predefined settings of a user of the lead device. A tuning note command may be personalized such that each receiving device may receive a separate, individualized tuning note command or tuning note tone.

In some embodiments, the method 900 further includes receiving a time signature and/or a tempo of a song for the drill. A time signature indicates a number of notes allowed per measure in a song or musical composition. For example, a 4/4 time signature indicates that there are 4 beats in each measure (indicated by top number in 4/4 signature) and the quarter note gets the beat (indicated by bottom number in 4/4 signature). As another example, a 2/4 time signature indicates that there are 2 beats in each measure and the quarter note gets the beat. A speed of a song or a tempo is measured in beats per minute. The tempo and/or time signature may be automatically associated with each drill or may be manually entered at a time of running a drill, for example. The tempo and/or time may be automatically determined by the system or input into the system by a user. The tempo may also include a tempo map feature such that a time signature and tempo may be assigned to individual measures or series of measures. Such tempo maps may be predetermined, automatically determined based on one or more inputs into the system, or manually entered by a user of the system.

In some embodiments, the method 900 further includes transmitting a metronome beat to the one or more receiving devices. The metronome beat is dependent on the time signature and the tempo. For example, a lead device may transmit to each of the one or more receiving devices a metronome beat during each count of the drill, on a downbeat of each measure of the song associated with the drill, on every other beat of each measure of the song associated with the drill, or at some other frequency. The frequency of the metronome beat may be automatically determined or preset by the system or manually configurable by a user of the system. In some embodiments, the lead device is configured to generate a sequence of counts at a tempo and a time signature, that is predetermined based on the selected song or music or input by a user. One or more receiving devices may play click sounds and/or flash a visual indicator (e.g., LED light) that is synchronized with the lead device. The one or more receiving devices may further be configured to display metronome status indications (e.g., current count, number of beats per measure, etc.).

Figure 8:
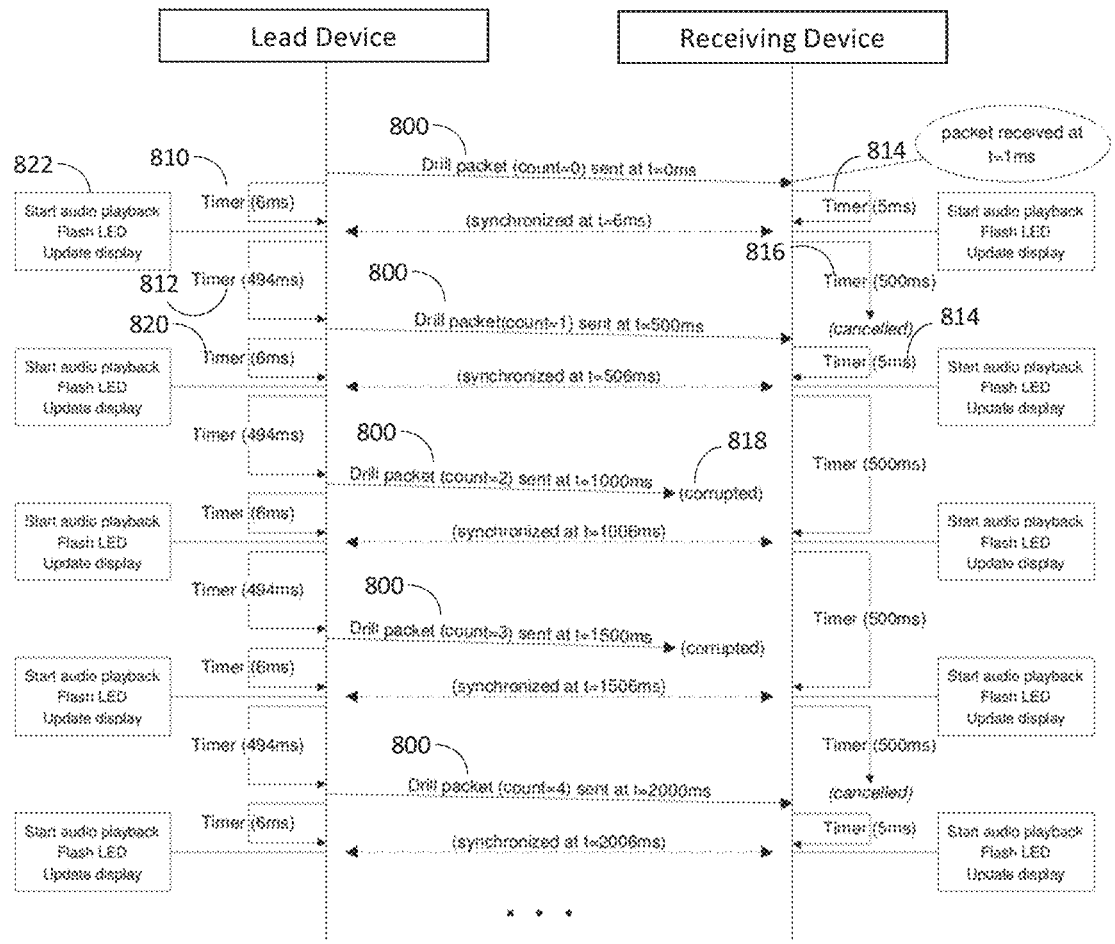
FIG. 8 illustrates a flow diagram of one embodiment of a synchronization method.

In some embodiments, the method 900 further includes synchronizing the one or more computing devices and the one or more receiving devices. FIG. 8 shows one embodiment of a method for synchronizing a receiving device with a lead device. During a drill, a lead device transmits a packet 800 for every count, one or more counts, or a plurality of counts in the drill. As described elsewhere herein, each packet includes information that allows the one or more receiving devices to synchronize their position (e.g., using coordinates) within the drill to that of the lead device. During drill execution, packet type 11 or drill mode is used, as described elsewhere herein. Upon receiving a request to nm a drill, the processor selects the requested drill and loads the drill into local storage. In the lead device, a timer is started to schedule events while executing the drill. The timer period generally corresponds to a tempo of the current count within the selected drill. As shown in FIG. 8, the tempo is 120 BPM resulting in 500 ms per count. An initial timer 810 is set to a duration expressed as the following exemplary, non-limiting formula:

$$t\_exp\_ms = t\_cur\_ms + x \text{ time}$$

where t_exp_ms is the timer expiration time in milliseconds, t_cur_ms is the current time in milliseconds, and x time is expiration time in milliseconds (in this example, x=6 ins) from the current time on the lead device.

In other words, the initial timer expires after x milliseconds calculated from current time.

Upon expiration of the timer, if no packets were transmitted, the loop is advanced to the next count within the drill, and the processor transmits a packet including, at least in part, a current drill number and a count within the drill and sets packet transmitted to 1. The processor then schedules the timer 810 to expire after a short delay according to the exemplary, non-limiting formula:

$$t\_exp\_ms = t\_exp\_ms + PACKET\_TX\_DELAY\_MS$$

where t_exp_ms is the timer expiration time in milliseconds, and

PACKET_TX_DELAY_MS 810 is the time it takes for the packet to be transmitted to a receiving device (e.g., 6 milliseconds).

In other words, time 810 is set to expire x milliseconds after the initial time, optionally plus a delay for packet transmission.

On the receiving device, PACKET_TX_DELAY_MS may further include an additional delay 814: RX_PACKET_DETECT_TIMEOUT_MS which is a time delay to allow the receiving device to detect a missing packet from the lead device (i.e., the packet transmitted by the lead device was corrupted or otherwise lost).

Upon the expiration of t_exp_ms=t_exp_ms+PACKET_TX_DELAY_MS timer 810 with or without RX_PACKET_DETECT_TIMEOUT_MS timer 814, the processor on the lead device initiates an audio playback sequence 822 associated with a current count in the drill. The audio playback may include a metronome beat and/or a command or prompt. The lead device may further flash a visual indicator (e.g., LED), or initiate a haptic or auditory signal to indicate that an audio playback sequence has been initiated. A display of the lead device may also be updated to reflect the current count in the drill and/or a drill status. The loop then repeats and sets packet transmitted to 0, as above. The processor then schedules the timer 812 to expire when a next or subsequent count of a drill is to be executed using the following exemplary, non-limiting formula:

$$t\_exp\_ms = t\_exp\_ms + (60 * 1000 * (100/cur\_speed\_pct)/cur\_tempo\_bpm) - PACKET\_TX\_DELAY\_MS$$

where t_exp_ms is the timer expiration time in milliseconds, t_cur_ms is the current time in milliseconds, cur_speed_pct is a scale factor between 50 and 150 percent that allows the playback to be sped up or slowed down, cur_tempo_bpm is a current tempo of the drill in beats per minute (bpm), and PACKET_TX_DELAY_MS 820 is the time it takes for the packet to be transmitted to a receiving device as well as an intentional delay (RX_PACKET_DETECT_TIMEOUT_MS) on the receiving device that is used while processing the packet (e.g., collectively 6 milliseconds).

During a drill, a processor on each receiving device expects a packet to be received from the lead device for one or more counts, every count, a plurality of counts, etc. in a drill. To account for instances in which the packet for a count is corrupted or otherwise lost 818, each receiving device includes in local storage a copy of the drill including a tempo for the drill. Alternatively, a receiving device in a group of receiving device includes a copy in local storage, such that the receiving device may transmit its copy to other receiving devices in the group. The copy may be manually loaded (e.g., USB) onto one or more receiving devices or, in some embodiments, computing or lead device 110 transmits one or more drills to the one or more receiving devices. As such, a receiving device is configured to predict a time at which a next or subsequent packet from the lead device should arrive. The time 816 is predicted according to the following exemplary, non-limiting formula:

$$t\_exp\_ms = t\_exp\_ms + PACKET\_TX\_DELAY\_MS + RX\_PACKET\_DETECT\_TIMEOUT\_MS$$

where t_exp_ms is the timer expiration time in milliseconds,

PACKET_TX_DELAY_MS 820 is the time it takes for the packet to be transmitted to a receiving device (e.g., 6 milliseconds), and RX_PACKET_DETECT_TIMEOUT_MS 814 is the time it takes for the receiving device to detect the transmitted packet from the lead device.

In other words, time 816 is set to expire after a first time which accounts for packet transmission and a second time which accounts for packet detection.

If a valid packet doesn't arrive (i.e., a lead device ID in the packet matches the configured lead device ID and the packet type is type 11 or a drill type) from the lead device within an expected or predetermined timeframe (within t_exp_ms=t_exp_ms+PACKET_TX_DELAY_MS+RX_PACKET_DETECT_TIMEOUT_MS), the receiving device continues execution of the drill using its own internal timer and copy of the drill or a received copy from another receiving device. As such, the processor on the receiving device executes the following loop listening for packets from the lead device, timer events, and/or user input. Upon receiving a valid packet from the lead device (i.e., the packet information matches the lead device ID and expected type (e.g., 11 or drill type), the processor sets the packet received to 1, and schedules a timer to expire after a short delay according to the following exemplary, non-limiting formula:

$$t\_exp\_ms = t\_cur\_ms + RX\_PACKET\_DETECT\_TIMEOUT\_MS$$

where t_exp_ms is the timer expiration time in milliseconds, t_cur_ms is the current tune in milliseconds, and RX_PACKET_DETECT_TIMEOUT_MS is the time it takes for the receiving device to detect the transmitted packet from the lead device. For example, the delay may be 5 milliseconds. In other words, the time on the receiving device is set to expire after a packet detection time period.

Upon expiration of the timer, if a packet has been received by the receiving device from the lead device, the processor on the receiving device determines whether a drill number in the packet is different than a drill number that is currently being executed (e.g., from a local copy on the receiving device or from a previously received packet). If the drill number is different than the drill that is currently being executed, the processor loads the selected drill from local storage on the receiving device. This allows the receiving device to synchronize to a correct drill and to set a local drill execution state to the same state within the received packet (current count, cur_speed_pct, etc.). In other words, the receiving device is synchronized to the lead device. Alternatively, if the expected packet has not arrived from the lead device, the receiving device advances to the next count within the drill from local storage on the receiving device. Upon advancing to the next count, the processor on the receiving device initiates an audio playback sequence associated with a current count in the drill. The audio playback may include a metronome beat and/or a command or prompt. The receiving device may further flash a visual indicator (e.g., LED), or initiate a haptic or auditory signal to indicate that an audio playback sequence has been initiated. A display of the receiving device may also be updated to reflect the current count in the drill and/or a drill status. The loop then repeats and sets packet transmitted to 0, as above. The processor then schedules the timer to expire when a next or subsequent count of a drill is to be executed using the following exemplary, non-limiting formula:

$$t\_exp\_ms = t\_exp\_ms + (60*1000*(100/cur\_speed\_pct)/cur\_tempo\_bpm)$$

where t_exp_ms is the timer expiration time in milliseconds, cur_speed_pct is a scale factor between 50 and 150 percent that allows the playback to be sped up or slowed down, and cur_tempo_bpm is a current tempo of the drill in beats per minute (bpm).

In some embodiments in which a receiving device includes a local copy of the drill, the processor on the receiving device may be configured to execute the drill locally, for example for practice, without needing a lead device.

In some embodiments, the method further includes receiving a user input to insert a pause into a drill. Alternatively, the pause may be inserted automatically into the drill, for example when one or more receiving devices are not synchronized with the lead device or between drills in a show. The pause may be deactivated or moved past when, for example, the system receives a user input (e.g., selection of user input device, i.e., button) on a lead device or at which point the lead device is synchronized with the one or more receiving devices according to, for example, the method described in FIG. 8.

In some embodiments, the method further includes outputting an attendance report based on which receiving devices are detected and/or present. Such receiving devices may be detected by the lead device by each receiving device transmitting to the lead device a packet comprising, at least, the receiving device ID.

One aspect of the present disclosure is directed to a method for coordinating movement of a group of people. In any of the preceding embodiments, the method is performed by one or more computing devices each comprising a processor. In any of the preceding embodiments, the method includes: receiving a pair of numerical coordinates for each count of a drill for each person in a group of people; receiving a starting count for each of the one or more sets and a number of counts in each of the one or more sets comprising the drill for each person in the group of people; combining the pair of numerical coordinates with the start count and the number of counts for each of the one or more sets; deriving a pair of human readable coordinates for each count of the drill for each person in the group of people; automatically determining a command based on a subset of the human readable coordinates that indicate a change in the location on the field for each person; and transmitting the command to one or more receiving devices each associated with one person in the group of people.

In any of the preceding embodiments, a plurality of counts comprise a set and one or more sets comprise the drill.

In any of the preceding embodiments, the pair of numerical coordinates indicates a location on a field for each person during each count.

In any of the preceding embodiments, the pair of human readable coordinates indicates the location on the field for each person during each count.

In any of the preceding embodiments, the location is relative to one or more markings on the field.

In any of the preceding embodiments, the method includes selecting a field type, for example: a football field, a soccer field, or a gymnasium.

In any of the preceding embodiments, the method includes selecting a field size selected from the group consisting of: a grade school regulation size field, a college regulation size field, and a professional regulation size field.

In any of the preceding embodiments, the method includes adjusting the pair of numerical coordinates to reflect the selected field type and field size.

In any of the preceding embodiments, the method includes receiving a time signature and a tempo of a song for the drill.

In any of the preceding embodiments, the method includes transmitting a metronome beat to the one or more receiving devices.

In any of the preceding embodiments, the metronome beat is dependent on the time signature and the tempo.

In any of the preceding embodiments, transmitting occurs at a radiofrequency above 900 MHz. In any of the preceding embodiments, transmitting occurs within the 915 MHz ISM band.

In any of the preceding embodiments, the method includes: synchronizing the one or more computing devices and the one or more receiving devices.

Another aspect of the present disclosure is directed to a system for coordinating movement of a group of people, comprising: one or more receiving devices each associated with a person in the group of people; one or more computing devices each comprising a processor; and memory, coupled to the processor, configured to store program instructions, wherein, when executed by the processor, the program instructions cause the one or more computing devices to perform a method. In any of the preceding embodiments, the method includes: receiving a pair of numerical coordinates for each count of a drill for each person in a group of people; receiving a starting count for each of the one or more sets and a number of counts in each of the one or more sets comprising the drill for each person in the group of people; combining the pair of numerical coordinates with the start count and the number of counts for each of the one or more sets; deriving a pair of human readable coordinates for each count of the drill for each person in the group of people; automatically determining a command based on a subset of the human readable coordinates that indicate a change in the location on the field for each person; and transmitting the command to one or more receiving devices each associated with one person in the group of people.

In any of the preceding embodiments, a plurality of counts comprise a set and one or more sets comprise the drill.

In any of the preceding embodiments, the pair of numerical coordinates indicates a location on a field for each person during each count.

In any of the preceding embodiments, the pair of human readable coordinates indicates the location on the field for each person during each count.

In any of the preceding embodiments, one or more of: the one or more computing devices and the one or more receiving devices are wearable.

In any of the preceding embodiments, the one or more computing devices and the one or more receiving devices each comprise an antenna.

In any of the preceding embodiments, the location is relative to one or more markings on the field.

In any of the preceding embodiments, the method performed by the one or more computing devices further comprises selecting a field type, for example: a football field, a soccer field, and a gymnasium.

In any of the preceding embodiments, the method performed by the one or more computing devices further comprises selecting a field size selected from the group consisting of: a grade school regulation size field, a college regulation size field, and a professional regulation size field In any of the preceding embodiments, the method performed by the one or more computing devices further comprises adjusting the pair of numerical coordinates to reflect the selected field type and field size.

In any of the preceding embodiments, the method performed by the one or more computing devices further comprises receiving a time signature and a tempo of a song for the drill.

In any of the preceding embodiments, the method performed by the one or more computing devices further comprises transmitting a metronome beat from the one or more computing devices to the one or more receiving devices.

In any of the preceding embodiments, the metronome beat is dependent on the time signature and the tempo.

In any of the preceding embodiments, transmitting occurs at a radiofrequency above 900 MHz. In any of the preceding embodiments, transmitting occurs within the 915 MHz ISM band.

In any of the preceding embodiments, the method performed by the one or more computing devices further comprises synchronizing the one or more computing devices and the one or more receiving devices.

Another aspect of the present disclosure is directed to a non-transitory computer-readable storage medium for use with one or more computing devices, the computer-readable storage medium storing program instructions, wherein, when executed by the one or more computing devices, the program instructions cause the one or more computing devices to perform one or more operations. In any of the preceding embodiments, the one or more operations comprise: receiving a pair of numerical coordinates for each count of a drill for each person in a group of people; receiving a starting count for each of the one or more sets and a number of counts in each of the one or more sets comprising the drill for each person in the group of people; combining the pair of numerical coordinates with the start count and the number of counts for each of the one or more sets; deriving a pair of human readable coordinates for each count of the drill for each person in the group of people; automatically determining a command based on a subset of the human readable coordinates that indicate a change in the location on the field for each person; and transmitting the command to one or more receiving devices each associated with one person in the group of people.

In any of the preceding embodiments, a plurality of counts comprise a set and one or more sets comprise the drill.

In any of the preceding embodiments, the pair of numerical coordinates indicates a location on a field for each person during each count.

In any of the preceding embodiments, the pair of human readable coordinates indicates the location on the field for each person during each count.

Another aspect of the present disclosure is directed to a method for coordinating movement of a group of people, the method performed by one or more computing devices each comprising a processor, comprising: receiving a pair of coordinates for one or more counts of a drill for one or more people; receiving a starting count for each of the one or more sets and a number of counts in each of the one or more sets comprising the drill; combining the pair of coordinates with the start count and the number of counts for each of the one or more sets; deriving a pair of human readable coordinates for the one or more counts of the drill for the one or more people; automatically determining a command based on a subset of the human readable coordinates that indicate a change in the location on the field; and transmitting the command to one or more receiving devices associated with the one or more people.

In any of the preceding embodiments, a plurality of counts comprise a set and one or more sets comprise the drill.

In any of the preceding embodiments, the pair of coordinates indicates a location on a field for the one or more people during the one or more counts.

In any of the preceding embodiments, the pair of human readable coordinates indicates the location on the field for the one or more people during the one or more counts In any of the preceding embodiments, the pair of coordinates is relative coordinates.

In any of the preceding embodiments, the pair of coordinates is absolute coordinates.

In any of the preceding embodiments, the pair of coordinates is text coordinates.

In any of the preceding embodiments, the pair of coordinates is numerical coordinates.

In any of the preceding embodiments, the pair of coordinates is x, y coordinates.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor on the leader device, receiving device, and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As used in the description and claims, the singular form "a", "an" and "the" include both singular and plural references unless the context clearly dictates otherwise. For example, the term "human readable coordinate" may include, and is contemplated to include, a plurality of human readable coordinates. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for coordinating movement, comprising:
   receiving, at a first receiving device, a plurality of packets from a computing device, each packet of the plurality of packets comprising a receiving device ID and a payload comprising commands for instructing a person to move at one or more counts in a drill, wherein the first receiving device comprises a first identification code that corresponds to a first receiving device ID;
   identifying, at the first receiving device, a packet, of the plurality of packets, having the first receiving device ID, wherein a payload of the packet comprises a first command, wherein the first command is based on a subset of human readable coordinates that indicates a first location on a field, for a first person associated with the first receiving device, during at least one count of the drill; and
   audibly outputting the first command from a speaker associated with the first receiving device.

2. The computer-implemented method of claim 1, further comprising:
   receiving, at a second receiving device, the plurality of packets from the computing device, wherein the second receiving device comprises a second identification code that corresponds to a second receiving device ID;
   identifying, at the second receiving device, a second packet, of the plurality of packets, having the second receiving device ID, wherein a payload of the second packet comprises a second command, wherein the second command is based on at least a pair of human readable coordinates that indicate a second location on the field, for a second person associated with the second receiving device, during the at least one count of the drill; and
   audibly outputting the second command from a speaker associated with the second receiving device.

3. The computer-implemented method of claim 1, further comprising receiving, at the first receiving device, a synchronization packet, wherein the synchronization packet comprises a pair of human readable coordinates for at least one in the drill to synchronize a coordinate position of the first receiving device within the drill to the coordinate position being commanded by the computing device.

4. The computer-implemented method of claim 1, further comprising:
   receiving, at the first receiving device, a second plurality of packets, each packet of the second plurality of packets comprising a receiving device ID and a payload comprising second commands for instructing the person to move during the one or more counts in the drill, and wherein the first receiving device expects to receive at least one expected packet in the second plurality of packets, the at least one expected packet comprising the first receiving device ID;
   determining, at the first receiving device, that the at least one expected packet of the second plurality of packets is missing or corrupted;
   initiating a time delay to detect at the first receiving device an arrival of the missing or corrupted expected packet from the second plurality of packets; and
   upon receiving the missing or corrupted expected packet during the time delay, determining whether a drill number in the missing or corrupted expected packet is different than a current drill number that is being executed.

5. The computer-implemented method of claim 1, further comprising:
   receiving, at the first receiving device, a second plurality of packets, each packet of the second plurality of packets comprising a receiving device ID and a payload comprising second commands for instructing the person to move during the one or more counts in the drill, and wherein the first receiving device expects to receive at least one expected packet in the second plurality of packets, the at least one expected packet comprising the first receiving device ID;
   determining, at the first receiving device, that the at least one expected packet of the second plurality of packets is missing or corrupted;
   initiating a time delay to detect at the first receiving device an arrival of the missing or corrupted expected packet from the second plurality of packets; and
   upon expiration of the time delay, accessing an internal timer and an internal copy of the drill to continue execution of the drill at the first receiving device using the internal timer and the internal copy of the drill.

6. The computer-implemented method of claim 1, further comprising:
   receiving, at the first receiving device, a second plurality of packets, each packet of the second plurality of packets comprising a receiving device ID and a payload comprising second commands for instructing the person to move during the one or more counts in the drill, and wherein the first receiving device expects to receive at least one expected packet in the second plurality of packets, the at least one expected packet comprising the first receiving device ID;

determining, at the first receiving device, that the at least one expected packet of the second plurality of packets is missing or corrupted;

initiating a time delay to detect at the first receiving device an arrival of the missing or corrupted expected packet from the second plurality of packets; and upon expiration of the time delay, receiving at the first receiving device a copy of the drill from a second receiving device.

7. The computer-implemented method of claim 4, further comprising:

when the drill number is different than the current drill number that is being executed, loading a selected drill from local storage to synchronize to the current drill number.

8. A system for coordinating movement, comprising:

a first receiving device comprising:
 a speaker,
 a processor, and
 a memory, wherein the memory is coupled to the processor and configured to store program instructions, and wherein, when executed by the processor, the program instructions cause the processor to perform a method comprising:
  receiving a plurality of packets from a computing device, each packet of the plurality of packets comprising a receiving device ID and a payload comprising commands for instructing a person to move at one or more counts in a drill, and wherein the first receiving device comprises a first identification code that corresponds to a first receiving device ID;
  identifying a packet, of the plurality of packets, having the first receiving device ID, wherein a payload of the packet comprises a first command, wherein the first command is based on a subset of human readable coordinates that indicates a first location on a field, for a first person associated with the first receiving device, during at least one count of the drill; and
  audibly outputting the first command from the speaker.

9. The system of claim 8, further comprising a second receiving device comprising:
 a second speaker,
 a second processor, and
 a second memory, wherein the second memory is coupled to the second processor and configured to store second program instructions, and wherein, when executed by the second processor, the second program instructions cause the second processor to perform a method comprising:
  receiving the plurality of packets from the computing device, wherein the second receiving device comprises a second identification code that corresponds to a second receiving device ID;
  identifying a second packet, of the plurality of packets, having a second receiving device ID, wherein a payload of the second packet comprises a second command, wherein the second command is based on at least a pair of human readable coordinates that indicate a second location on the field, for a second person associated with the second receiving device, during the at least one count of the drill; and
  audibly outputting the second command from the second speaker.

10. The system of claim 8, wherein the program instructions further cause the processor to perform the method comprising: receiving a synchronization packet, wherein the synchronization packet comprises a pair of human readable coordinates for the at least one count in the drill to synchronize a coordinate position of the first receiving device within the drill to the coordinate position being commanded by the computing device.

11. The system of claim 8, wherein the program instructions further cause the processor to perform the method comprising:

receiving a second plurality of packets, each packet of the second plurality of packets comprising a receiving device ID and a payload comprising second commands for instructing the person to move during the one or more counts in the drill, and wherein the first receiving device expects to receive an expected packet in the second plurality of packets, the expected packet comprising the first receiving device ID;

determining that the expected packet of the second plurality of packets is missing or corrupted;

accessing an internal timer and an internal copy of the drill to continue execution of the drill using the internal timer and the internal copy of the drill;

initiating a loop to detect an arrival of a second expected packet in a third plurality of packets, each packet of the third plurality of packets comprising a receiving device ID and a payload comprising third commands for instructing the person to move during the one or more counts in the drill, the second expected packet comprising the first receiving device ID; and upon receiving the second expected packet during the loop, determining whether a drill number in the second expected packet is different than a current drill number that is being executed.

12. The system of claim 11, further comprising:

when the drill number is different than the current drill number that is being executed, loading a selected drill from local storage to synchronize to the current drill number.

13. The system of claim 8, wherein the program instructions further cause the processor to perform the method comprising:

receiving a second plurality of packets, each packet of the second plurality of packets comprising a receiving device ID and a payload comprising second commands for instructing the person to move during the one or more counts in the drill, and wherein the first receiving device expects to receive an expected packet in the second plurality of packets, the expected packet comprising the first receiving device ID;

determining that the expected packet of the second plurality of packets is missing or corrupted;

accessing an internal timer and an internal copy of the drill to continue execution of the drill using the internal timer and the internal copy of the drill;

initiating a loop to detect an arrival of a second expected packet in a third plurality of packets, each packet of the third plurality of packets comprising a receiving device ID and a payload comprising third commands for instructing the person to move during the one or more counts in the drill, the second expected packet comprising the first receiving device ID; and upon expiration of the time delay loop without receiving the second expected packet, repeating the loop and advancing to a next count of the drill from the internal copy of the drill to continue execution of the drill using the internal timer and the internal copy of the drill.

14. The system of claim 8, wherein the program instructions further cause the processor to perform the method comprising:
receiving a second plurality of packets, each packet of the second plurality of packets comprising a receiving device ID and a payload comprising second commands for instructing the person to move during the one or more counts in the drill, and wherein the first receiving device expects to receive an expected packet in the second plurality of packets, the expected packet comprising the first receiving device ID;
determining that the expected packet of the second plurality of packets is missing or corrupted;
receiving a copy of the drill from a second receiving device to continue execution of the drill using an internal timer; and
initiating a loop to detect an arrival of a second expected packet in a third plurality of packets, each packet of the third plurality of packets comprising a receiving device ID and a payload comprising third commands for instructing the person to move during the one or more counts in the drill, the second expected packet comprising the first receiving device ID.

15. A non-transitory computer-readable storage medium for use with a first receiving device, the computer-readable storage medium storing program instructions, wherein, when executed by the first receiving device, the program instructions cause the first receiving device to perform one or more operations comprising:
receiving a plurality of packets from a computing device, each packet of the plurality of packets comprising a receiving device ID and a payload comprising commands for instructing a person to move at one or more counts in a drill, wherein the first receiving device comprises a first identification code that corresponds to a first receiving device ID;
identifying a packet, of the plurality of packets, having a first receiving device ID, wherein a payload of the packet comprises a first command, wherein the first command is based on a subset of human readable coordinates that indicate a first location on a field, for a first person associated with the first receiving device, during at least one count of the drill; and
audibly outputting the first command from a speaker associated with the first receiving device.

16. The non-transitory computer-readable storage medium of claim 15, wherein the program instructions further cause the first receiving device to perform the one or more operations comprising: receiving a synchronization packet, wherein the synchronization packet comprises a pair of human readable coordinates for the at least one count in the drill to synchronize a coordinate position of the first receiving device within the drill to the coordinate position being commanded by the computing device.

17. The non-transitory computer-readable storage medium of claim 15, wherein the program instructions further cause the first receiving device to perform the one or more operations comprising:
receiving a second plurality of packets, each packet of the second plurality of packets comprising a receiving device ID and a payload comprising second commands for instructing the person to move during the one or more counts in the drill, and wherein the first receiving device expects to receive at least one expected packet in the second plurality of packets, the at least one expected packet comprising the first receiving device ID;
determining that the at least one expected packet of the second plurality of packets is missing or corrupted;
initiating a time delay to detect an arrival of the missing or corrupted expected packet from the second plurality of packets; and
upon receiving the missing or corrupted expected packet during the time delay, determining whether a drill number in the missing or corrupted packet is different than a current drill number that is being executed.

18. The non-transitory computer-readable storage medium of claim 17, further comprising:
when the drill number is different than the current drill number that is being executed, loading a selected drill from local storage to synchronize to the current drill number.

19. The non-transitory computer-readable storage medium of claim 15, wherein the program instructions further cause the first receiving device to perform the one or more operations comprising:
receiving a second plurality of packets, each packet of the second plurality of packets comprising a receiving device ID and a payload comprising second commands for instructing the person to move during the one or more counts in the drill, and wherein the first receiving device expects to receive at least one expected packet in the second plurality of packets, the at least one expected packet comprising the first receiving device ID;
determining that the at least one expected packet of the second plurality of packets is missing or corrupted;
initiating a time delay to detect an arrival of the missing or corrupted expected packet from the second plurality of packets; and
upon expiration of the time delay, accessing an internal timer and an internal copy of the drill to continue execution of the drill using the internal timer and the internal copy of the drill.

20. The non-transitory computer-readable storage medium of claim 15, wherein the program instructions further cause the first receiving device to perform the one or more operations comprising:
receiving a second plurality of packets, each packet of the second plurality of packets comprising a receiving device ID and a payload comprising second commands for instructing the person to move during the one or more counts in the drill, and wherein the first receiving device expects to receive at least one expected packet in the second plurality of packets, the at least one expected packet comprising a first receiving device ID;
determining that the at least one expected packet of the second plurality of packets is missing or corrupted;
initiating a time delay to detect an arrival of the missing or corrupted expected packet from the second plurality of packets; and
upon expiration of the time delay, receiving a copy of the drill from a second receiving device.

* * * * *